(12) United States Patent
Chen et al.

(10) Patent No.: US 11,277,329 B2
(45) Date of Patent: Mar. 15, 2022

(54) SYSTEM AND METHOD FOR HANDLING IGP FLOODING TOPOLOGY INCONSISTENCY

(71) Applicant: HUAWEI TECHNOLOGIES CO., LTD., Shenzhen (CN)

(72) Inventors: Huaimo Chen, Bolton, MA (US); Dean Cheng, Los Altos, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/068,465

(22) Filed: Oct. 12, 2020

(65) Prior Publication Data

US 2021/0029017 A1    Jan. 28, 2021

Related U.S. Application Data

(63) Continuation of application No. PCT/US2019/057187, filed on Oct. 21, 2019.

(60) Provisional application No. 62/811,170, filed on Feb. 27, 2019.

(51) Int. Cl.
*H04L 12/28* (2006.01)
*H04L 45/021* (2022.01)
*H04L 45/00* (2022.01)

(52) U.S. Cl.
CPC ............ *H04L 45/021* (2013.01); *H04L 45/26* (2013.01); *H04L 45/32* (2013.01)

(58) Field of Classification Search
CPC ....... H04L 45/021; H04L 45/26; H04L 45/32; H04L 45/44; H04L 45/48
See application file for complete search history.

(56) References Cited

U.S. PATENT DOCUMENTS

| 2008/0186907 | A1* | 8/2008 | Yagyuu | H04W 40/30 370/328 |
| 2021/0119910 | A1* | 4/2021 | Chen | H04L 45/28 |
| 2021/0211376 | A1* | 7/2021 | Chen | H04L 45/24 |

FOREIGN PATENT DOCUMENTS

| WO | WO-2020113214 A1 * | 6/2020 | ............ H04L 45/28 |
| WO | WO-2020176140 A1 * | 9/2020 | ........... H04L 45/021 |

OTHER PUBLICATIONS

Chen, H., et al., "LS Flooding Reduction," draft-cc-lsr-flooding-reduction-01, Jan. 7, 2019, 37 pages.
Chen, H., et al., "LS Distributed Flooding Reduction," draft-cc-lsr-flooding-reduction-03, Mar. 11, 2019, 24 pages.
Katz, D., et al., "Traffic Engineering (TE) Extensions to OSPF Version 2," RFC 3630, Sep. 2003, 14 pages.

(Continued)

*Primary Examiner* — Abdelnabi O Musa
(74) *Attorney, Agent, or Firm* — Conley Rose, P.C.

(57) ABSTRACT

A network node (N1) for handling IGP flooding topology (FT) inconsistency by obtaining a new FT and setting a FT flag field (FT field) in a data packet (DP) to indicate whether a link between N1 and a second node (N2) is on the new FT. N1 transmits the DP to N2. N1 receives a second DP from N2 that includes the FT field set by N2 to indicate whether the link between the network node and N2 is on the new FT as determined by N2. N1 sets a FT inconsistency field in a link state packet to indicate an inconsistency in the new FT when the FT field set by N2 and the FT field set by N1 are different for a given time. N1 distributes the LS to at least one node in the network.

20 Claims, 18 Drawing Sheets

(56) References Cited

OTHER PUBLICATIONS

Vasseur, JP., et al., "Definition of an IS-IS Link Attribute Sub-TLV," RFC 5029, Sep. 2007, 6 pages.
Zinin, A., et al., "OSPF Link-Local Signaling," RFC 5613, Aug. 2009, 12 pages.
Psenak, P., "OSPFv2 Prefix/Link Attribute Advertisement," RFC 7684, Nov. 2015, 15 pages.

* cited by examiner

1400

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            LS age 1402        |   Options   1404  |LS Type =10 1406|
+-+-+-+-+-+-+-+-+-+-+-+-+-+-+-+-+-+-+-+-+-+-+-+-+-+-+-+-+-+-+-+-+
|Opaque Type 1408|                  Instance ID 1410             |
+-+-+-+-+-+-+-+-+-+-+-+-+-+-+-+-+-+-+-+-+-+-+-+-+-+-+-+-+-+-+-+-+
|                     Advertising Router 1412                    |
+-+-+-+-+-+-+-+-+-+-+-+-+-+-+-+-+-+-+-+-+-+-+-+-+-+-+-+-+-+-+-+-+
|                      LS Sequence Number 1414                   |
+-+-+-+-+-+-+-+-+-+-+-+-+-+-+-+-+-+-+-+-+-+-+-+-+-+-+-+-+-+-+-+-+
|        LS checksum 1416       |         Length 1418            |
+-+-+-+-+-+-+-+-+-+-+-+-+-+-+-+-+-+-+-+-+-+-+-+-+-+-+-+-+-+-+-+-+
|                                                                |
~                         Link TLV 1420                          ~
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           LS age 1602         | 1604 Options  |LS Type =10 1606|
+-+-+-+-+-+-+-+-+-+-+-+-+-+-+-+-+-+-+-+-+-+-+-+-+-+-+-+-+-+-+-+-+
|Opaque Type 1608|                 Instance ID 1610              |
+-+-+-+-+-+-+-+-+-+-+-+-+-+-+-+-+-+-+-+-+-+-+-+-+-+-+-+-+-+-+-+-+
|                     Advertising Router 1612                    |
+-+-+-+-+-+-+-+-+-+-+-+-+-+-+-+-+-+-+-+-+-+-+-+-+-+-+-+-+-+-+-+-+
|                     LS Sequence Number 1614                    |
+-+-+-+-+-+-+-+-+-+-+-+-+-+-+-+-+-+-+-+-+-+-+-+-+-+-+-+-+-+-+-+-+
|         LS checksum 1616      |           Length 1618          |
+-+-+-+-+-+-+-+-+-+-+-+-+-+-+-+-+-+-+-+-+-+-+-+-+-+-+-+-+-+-+-+-+
|                                                                |
~                     Extended Link TLV 1620                     ~
+-+-+-+-+-+-+-+-+-+-+-+-+-+-+-+-+-+-+-+-+-+-+-+-+-+-+-+-+-+-+-+-+
```

*FIG. 16*

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |    INFO-TLV-Type (TBD6) 1702  |         TLV-Length 1704       |
   +-+-+-+-+-+-+-+-+-+-+-+-+-+-+-+-+-+-+-+-+-+-+-+-+-+-+-+-+-+-+-+-+
   |  Priority 1706|           Reserved (MUST be zero) 1708    |I|
   +-+-+-+-+-+-+-+-+-+-+-+-+-+-+-+-+-+-+-+-+-+-+-+-+-+-+-+-+-+-+-+-+
   ~                    sub TLVs (optional) 1710                 1712 ~
   +-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|INF-Type 2102 |    Length 2104|
+-+-+-+-+-+-+-+-+-+-+-+-+-+-+-+-+-+-+-+-+-+-+-+-+-+-+-+-+-+-+-+-+
|2106 Priority |        Reserved (MUST be zero)   2108    |I|
+-+-+-+-+-+-+-+-+-+-+-+-+-+-+-+-+-+-+-+-+-+-+-+-+-+-+-+-+-+-+-+-+  2112
~           sub TLVs (optional)  2110                           ~
+-+-+-+-+-+-+-+-+-+-+-+-+-+-+-+-+-+-+-+-+-+-+-+-+-+-+-+-+-+-+-+-+
```

SYSTEM AND METHOD FOR HANDLING IGP FLOODING TOPOLOGY INCONSISTENCY

CROSS-REFERENCE TO RELATED APPLICATIONS

This application is a continuation of International Application No. PCT/US2019/057187 filed on Oct. 21, 2019, by Futurewei Technologies, Inc., and titled "System and Method for Handling IGP Flooding Topology Inconsistency," which claims the benefit of U.S. Provisional Patent Application No. 62/811,170 filed Feb. 27, 2019, by Huaimo Chen, et al., and titled "System and Method for Handling IGP Flooding Topology Inconsistency," which is hereby incorporated by reference.

TECHNICAL FIELD

The present disclosure is generally related to network communications, and in particular, to various systems and methods for Handling Interior Gateway Protocol (IGP) Flooding Topology Inconsistency.

BACKGROUND

IGP flooding is used to distribute link state information across a network. IGP flooding is paramount for Link State IGP as routing computations assume that the Link State Databases (LSDBs) are always in sync across all nodes in the flooding domain. LSDB inconsistencies across nodes can cause routing inconsistencies and micro-loops leading to packets losses, link overload, and jitter for all classes of services.

SUMMARY

A first aspect relates to a method performed by a network node (N1) for Handling Interior Gateway Protocol (IGP) flooding topology inconsistency. The method stores a current flooding topology a network. The method computes a new flooding topology of the network. The method determines whether there is a flooding topology change of a link between N1 and a second node (N2) on the current flooding topology based on the new flooding topology. In response to a determination that there is a flooding topology change of the link between N1 and N2 on the current flooding topology, the method sets a flooding topology flag field (FT field) in a data packet to indicate whether the link between N1 and N2 is on the new flooding topology. The method transmits the data packet containing the flooding topology flag field to at least one node in the network.

Optionally, in a first implementation according to the first aspect, the method receives a second data packet from N2. The second data packet comprises the flooding topology flag field set by N2 to indicate whether the link between N1 and N2 is on the new flooding topology as determined by N2. The method compares the flooding topology flag field set by N2 in the second data packet to the flooding topology flag field set by N1 in the data packet. The method determines whether there is a flooding topology inconsistency of the link between N1 and N2 on the new flooding topology based on the flooding topology flag field set by N2 in the second data packet and the flooding topology flag field set by N1. The method sets a flooding topology inconsistency field (I-field) in a link state (LS) packet to indicate an inconsistency in the new flooding topology if the flooding topology flag field set by N2 in the second data packet and the flooding topology flag field set by N1 are different. In an implementation, the method sets a flooding topology inconsistency field (I-field) in a link state (LS) packet to indicate an inconsistency in the new flooding topology only if the flooding topology flag field set by N2 in the second data packet and the flooding topology flag field set by N1 are different for a given/predetermined time. The LS containing the flooding topology inconsistency field (I-field) is distributed to nodes in the network.

Optionally, in a second implementation according to the first aspect, or any preceding implementation of the first aspect, the LS containing the flooding topology inconsistency field (I-field) is a link state packet (LSP) with an Intermediate System to Intermediate System (IS-IS) Flooding Reduction Information type-length-value (TLV), and the flooding topology inconsistency field (I-field) is defined in the IS-IS Flooding Reduction Information type-length-value (TLV).

Optionally, in a third implementation according to the first aspect, or any preceding implementation of the first aspect, the LS containing the flooding topology inconsistency field (I-field) is a Router Information (RI) Link State Advertisement (LSA) with an Open Shortest Path First (OSPF) Flooding Reduction Information TLV, and the flooding topology inconsistency field (I-field) is defined in OSPF Flooding Reduction Information TLV.

Optionally, in a fourth implementation according to the first aspect, or any preceding implementation of the first aspect, the flooding topology flag field (FT field) is defined in an Extended Options and Flag (EOF) TLV defined by RFC 5613, and the data packet is an OSPF Hello data packet that includes a link-local signaling (LLS) data block containing the EOF-TLV.

Optionally, in a fifth implementation according to the first aspect, or any preceding implementation of the first aspect, the flooding topology flag field (FT field) is defined in a new Link Attributes Sub-TLV.

Optionally, in a sixth implementation according to the first aspect, or any preceding implementation of the first aspect, the new Link Attributes Sub-TLV is included in a Link TLV defined in RFC 3630, and the Link TLV is included in an OSPFv2 Traffic Engineering (TE) Opaque LSA.

Optionally, in a seventh implementation according to the first aspect, or any preceding implementation of the first aspect, the new Link Attributes Sub-TLV is included in an Extended Link TLV defined in RFC 7684, and the Extended Link TLV is included in an OSPFv2 Extended Link Opaque LSA.

Optionally, in an eighth implementation according to the first aspect, or any preceding implementation of the first aspect, the flooding topology flag field (FT field) is defined in an Extended Options and Flag (EOF) TLV defined in IS-IS, and the data packet is an IS-IS Hello data packet that includes the EOF TLV containing the FT field.

Optionally, in a ninth implementation according to the first aspect, or any preceding implementation of the first aspect, the flooding topology flag field (FT field) is defined in a Link Attributes Sub-TLV defined in RFC 5029, and the data packet is a LSP that includes an extended IS reachability TLV that includes the Link Attributes Sub-TLV containing the FT field.

Optionally, in a ninth implementation according to the first aspect, or any preceding implementation of the first aspect, the flooding topology inconsistency is that the flooding topology flag field (FT field) for the link between N1 and N2 on the new flooding topology set by N2 is different from the FT field for the link between N1 and N2 on the new flooding topology set by N1 for a given time.

Optionally, in a tenth implementation according to the first aspect, or any preceding implementation of the first aspect, the method receives the new flooding topology from a leader node of a topology designated to determine and distribute the new flooding topology.

Optionally, in an eleventh implementation according to the first aspect, or any preceding implementation of the first aspect, the flooding topology inconsistency of the link between N1 and N2 is determined only after the flooding topology flag field set by N2 is different than the flooding topology flag field set by N1 in the data packet for at least one of a predetermined number of data packets or for a predetermined time period.

Optionally, in a twelfth implementation according to the first aspect, or any preceding implementation of the first aspect, the method issues a warning message regarding the flooding topology inconsistency of the link between N1 and a second node (N2) on the new flooding topology to a network monitoring node.

Optionally, in a thirteenth implementation according to the first aspect, or any preceding implementation of the first aspect, the method issues subsequent warning messages only after a predetermine time interval.

Optionally, in a fourteenth implementation according to the first aspect, or any preceding implementation of the first aspect, the method logs the flooding topology inconsistency of the link between N1 and N2 in a data file.

Optionally, in a fifteenth implementation according to the first aspect, or any preceding implementation of the first aspect, the method receives instructions from a leader node to initiate full flooding mode instead of flooding reduction mode in response to the leader node receiving the LS containing the flooding topology inconsistency field (I-field) that indicated the flooding topology inconsistency of the link between N1 and N2 on the new flooding topology. The method initiates the full flooding mode in response to receiving the instructions.

Optionally, in a sixteenth implementation according to the first aspect, or any preceding implementation of the first aspect, the flooding topology flag field (FT field) is one (1) bit to indicate that the link between N1 and N2 is on the new flooding topology.

Optionally, in a seventeenth implementation according to the first aspect, or any preceding implementation of the first aspect, the flooding topology inconsistency field (I-field) is one (1) bit to indicate that there is a flooding topology inconsistency.

Optionally, in an eighteenth implementation according to the first aspect, or any preceding implementation of the first aspect, the data packet containing the flooding topology flag field is transmitted to N2.

Optionally, in a nineteenth implementation according to the first aspect, or any preceding implementation of the first aspect, the data packet containing the flooding topology flag field is transmitted using the new flooding topology to other nodes in the network.

A second aspect relates to a network node comprising network communication means, a data storage means, and a processing means. The network node is specially configured to perform any of the first aspect, or any preceding implementation of the first aspect.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 14 is a schematic diagram illustrating an OSPFv2 traffic engineering (TE) opaque link state advertisement (LSA) in accordance with another embodiment of the present disclosure.

FIG. 16 is a schematic diagram illustrating an OSPFv2 extended link opaque LSA in accordance with another embodiment of the present disclosure.

FIG. 17 is a schematic diagram illustrating an OSPF flooding reduction information TLV in accordance with another embodiment of the present disclosure.

FIG. 21 is a schematic diagram illustrating an I-bit in an IS-IS flooding reduction information TLV in accordance with another embodiment of the present disclosure.

DETAILED DESCRIPTION

Figure 1:
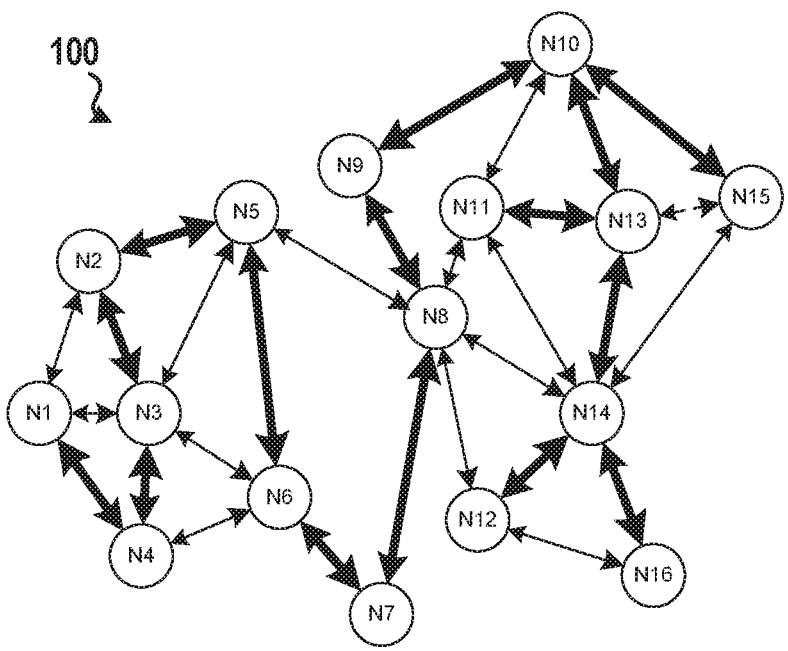
FIG. 1 is a schematic diagram illustrating flooding topology in accordance with an embodiment of the present disclosure.

It should be understood at the outset that although an illustrative implementation of one or more embodiments are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure describes various systems and methods for handling interior gateway protocol (IGP) flooding topology inconsistency. OSPF and IS-IS deploy a so-called reliable flooding mechanism, where a node must transmit a received or self-originated LS to all its interfaces (except the interface where an LS is received). The flooding mechanism can employ a distributed mode or a centralized mode. In the distributed flooding reduction solution or mode, every node in a network area computes a flooding topology (FT) and floods the link states based on the FT. In centralized flooding reduction solution or mode, a leader in the area computes a FT and advertises the FT to every node which floods the link states based on the FT. IGP flooding topology inconsistencies can occur when the FT computed by one node is different from the one computed by another node, or when the FT received by one node is different from the one received by another node.

The disclosed embodiments seek to resolve the above problems by detecting and handling the inconsistency of the flooding topologies accordingly. For example, in the distributed flooding reduction solution or mode, the flooding topology computed by one node needs to be the same as the one computed by another node. When two flooding topologies computed by two nodes are different, this inconsistency needs to be detected and handled accordingly. In the centralized flooding reduction solution or mode, the flooding topology received by one node needs to be the same as the one received by another node. When two flooding topologies received by two nodes are different, this inconsistency needs to be detected and handled accordingly. In an embodiment, FT inconsistency is resolved by triggering the re-computation of the FTs in the distributed flooding reduction solution or mode. For a link attached to a node, the node marks whether the link is on the flooding topology using a flag called FT bit or FT flag. For example, if the link is on the flooding topology computed or received by the node, the flag for the link is set to one; otherwise (i.e., that the link is not on the flooding topology computed or received by the node), the flag for the link is set to zero. The node may distribute the FT bit of the link to other nodes in the network, or just to the remote adjacent node of the link. If the inconsistency persists, a roll back request to normal flooding may be performed.

In an embodiment, in OSPF, the node distributes the FT bit of the link to the remote adjacent node of the link through defining and using a new FT bit in Extended Options and Flag (EOF) TLV in OSPF Hello.

In another embodiment, in IS-IS, a new TLV, called Extended Options and Flag (EOF) TLV, is defined. It may be included in an IS-IS Hello. Similar to OSPF, a new flag bit, called link on flooding topology (FT-bit for short), is defined and used in EOF-TLV.

In another embodiment, in OSPF, the node distributes the FT-bit of the link to other nodes in the network through defining and using a new TLV, called Link Attributes Sub-TLV similar to EOF-TLV under Link TLV defined in RFC 3630, and a new FT-bit in the Sub-TLV. Alternatively, this Sub-TLV may be included in the Extended Link TLV defined in RFC 7684. If only one of the two TLVs is distributed in the network, the Sub-TLV will be included in this TLV. If both TLVs are distributed in the network, the Sub-TLV will be included in the Extended Link TLV. If neither of the two TLVs is distributed in the network, the Sub-TLV will be included in the Extended Link TLV, which is distributed in the network.

In another embodiment, in IS-IS, the node distributes the FT-bit of the link to other nodes in the network through defining and using a new FT-bit in the Link Attributes Sub-TLV defined in RFC 5029.

FIG. 1 is a schematic diagram illustrating flooding topology 100 in accordance with an embodiment of the present disclosure. For a given network topology, a flooding topology is a sub-graph or sub-network of a given network topology that has the same reachability to every node as the given network topology, through which link states are flooded. All the nodes (e.g., N1-N16) in the given network topology must be in the flooding topology 100. All the nodes must be inter-connected directly or indirectly. As a result, link state (LS) flooding will in most cases occur only on the flooding topology 100, which includes all nodes and a subset of links (bold links indicate the flooding topology 100 in FIG. 1).

Many different flooding topologies can be constructed for a given network topology. For example, a chain connecting all the nodes in the given network topology is a flooding topology, a circle connecting all the nodes is another flooding topology, and a tree connecting all the nodes is a flooding topology. It should be noted that even though the flooding topology 100 is a sub-graph of the original topology, any single LS must still be disseminated in the entire network.

There are many different ways to construct a flooding topology for a given network topology including a central mode, a distributed mode, and a static mode. In a central mode, one node in the network builds the flooding topology 100 and floods the flooding topology 100 to all the other nodes in the network. In a distributed mode, each node in the network automatically calculates the flooding topology 100 by using the same algorithm. In a static mode, links on the flooding topology 100 are configured statically. The disclosed embodiments are applicable to any of the modes used for constructing the flooding topology 100.

Figure 2:
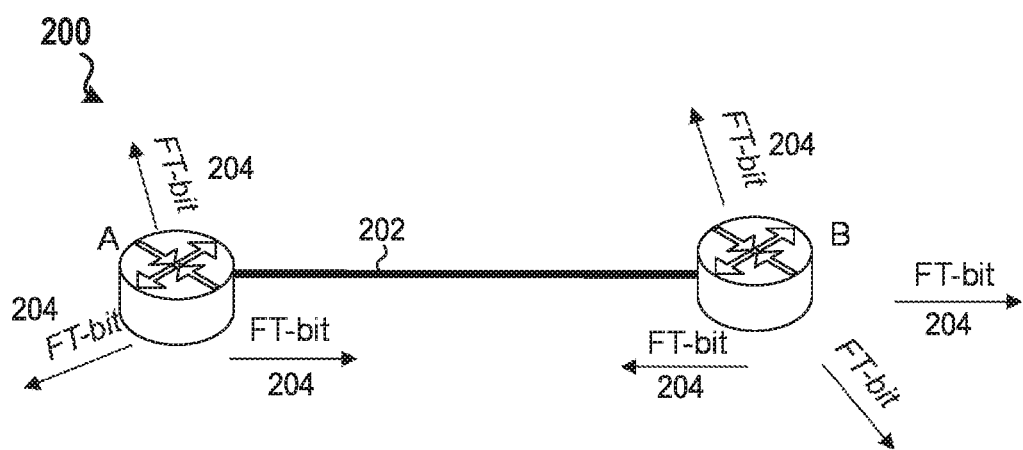
FIG. 2 is a schematic diagram illustrating the communication of a flooding topology bit (FT-bit) to a neighbor node on the flooding topology in accordance with an embodiment of the present disclosure.

The disclosed embodiments introduce a new flooding topology bit (FT-Bit) that is used to identify whether a link is on the flooding topology. FIG. 2 is a schematic diagram illustrating the communication of an FT-bit 204 to a neighbor node on a flooding topology 200 in accordance with an embodiment of the present disclosure. In an embodiment, node A computes a new flooding topology and sends a Hello packet with FT-bit 204 set to one (1) to node B when link 202 is on the new flooding topology. Likewise, node B computes a new flooding topology and sends a Hello packet with FT-bit 204 set to one (1) to node A when link 202 is on the new flooding topology.

In an embodiment, node A computes a new flooding topology and sends a Hello packet with FT-bit 204 set to zero (0) or without an EOF TLV (as described below) to node B when link 202 is not on the new flooding topology. Likewise, node B computes a new flooding topology and sends a Hello packet with FT-bit 204 set to zero (0) or without an EOF TLV (i.e., without FT-bit 204) to node A when link 202 is not on the new flooding topology.

If the Hello packets from the two nodes have the same FT-bit 204 value, then the flooding topology regarding to the link 202 between node A and node B is consistent. That is, if both node A and node B receive the Hello packets with the FT-bit 204 set to one (1) or with the FT-bit 204 set to zero (0) from each other, then the flooding topology regarding to the link 202 between node A and node B is consistent.

If one of the nodes (e.g., node A) sets the FT-bit 204 to one (1) and the other node (i.e., node B) sets the FT-bit 204 to zero (0), or vice versa, then the flooding topology regarding to the link 202 between node A and node B is not consistent. If this occurs, the inconsistency is advertised. In an embodiment, node A and/or node B can inform the other nodes in the network of the inconsistency of the link 202 between node A and node B on the flooding topology using an inconsistency bit (I-bit) as further described herein (e.g., setting the I-bit to one (1) in a Flooding Reduction Information TLV in the LSA/LSP). In an embodiment, a node (i.e., node A or node B) may wait until the inconsistency occurs for a predetermined time interval (e.g., such as after 6 Hello packets or a given time) before reporting the inconsistency of the link 202 between node A and node B to reduce the chances of a false positive. The consistency and inconsistency for the flooding topology regarding a point-to-point link between node A and node B can be extended to a broadcast link among a number nodes attached to the link. In an embodiment, when the node, which advertises or originates the link state containing the instruction to do the distributed flooding reduction, receives the inconsistency, it may decide to instruct all the nodes to roll back to normal flooding.

As further described herein, the FT-bit 204 can be carried in a number of different types of messages. For example, if the link 202 between node A and node B is not on the current flooding topology but is on the new flooding topology computed by node A, node A advertises an LSA or LSP containing a Link Attributes Sub-TLV (as described herein) with the FT-bit 204 set to one (1) for the link 202. Likewise, if the link 202 between node A and node B is not on the current flooding topology but is on the new flooding topology computed by node B, node B advertises an LSA or LSP containing a Link Attributes Sub-TLV with the FT-bit set 204 to one (1) for the link 202. If the LSA/LSPs from the two nodes have the same FT-bit 204 value for the link 202, then the flooding topology regarding to the link 202 between node A and node B is consistent, otherwise the flooding topology regarding the link 202 between node A and node B is not consistent.

As described herein, in the various embodiments, when an inconsistency on the flooding topology regarding a link between two nodes is detected, a warning can be issued or logged. In one embodiment, only one of the two nodes issues or logs the warning when the current flooding topology regarding the link between the two nodes is not consistent. In another embodiment, the two nodes issue or log the warning when the current FT regarding to the link between the two nodes is not consistent. Still, in another embodiment, the warning is issued or logged after the previous warning is issued or logged for a given period of time.

In some embodiments, when an inconsistency on the flooding topology regarding a link between two nodes is detected, the flooding behavior is changed. In one embodiment, the node receiving the Hello packets with the FT-bit set to one (1) from the other node assumes that the link is on the flooding topology temporarily and floods the link states over the link. In another embodiment, the node uses the normal flooding behavior. In a third embodiment, both nodes maintain the normal flooding behavior.

Figure 3:
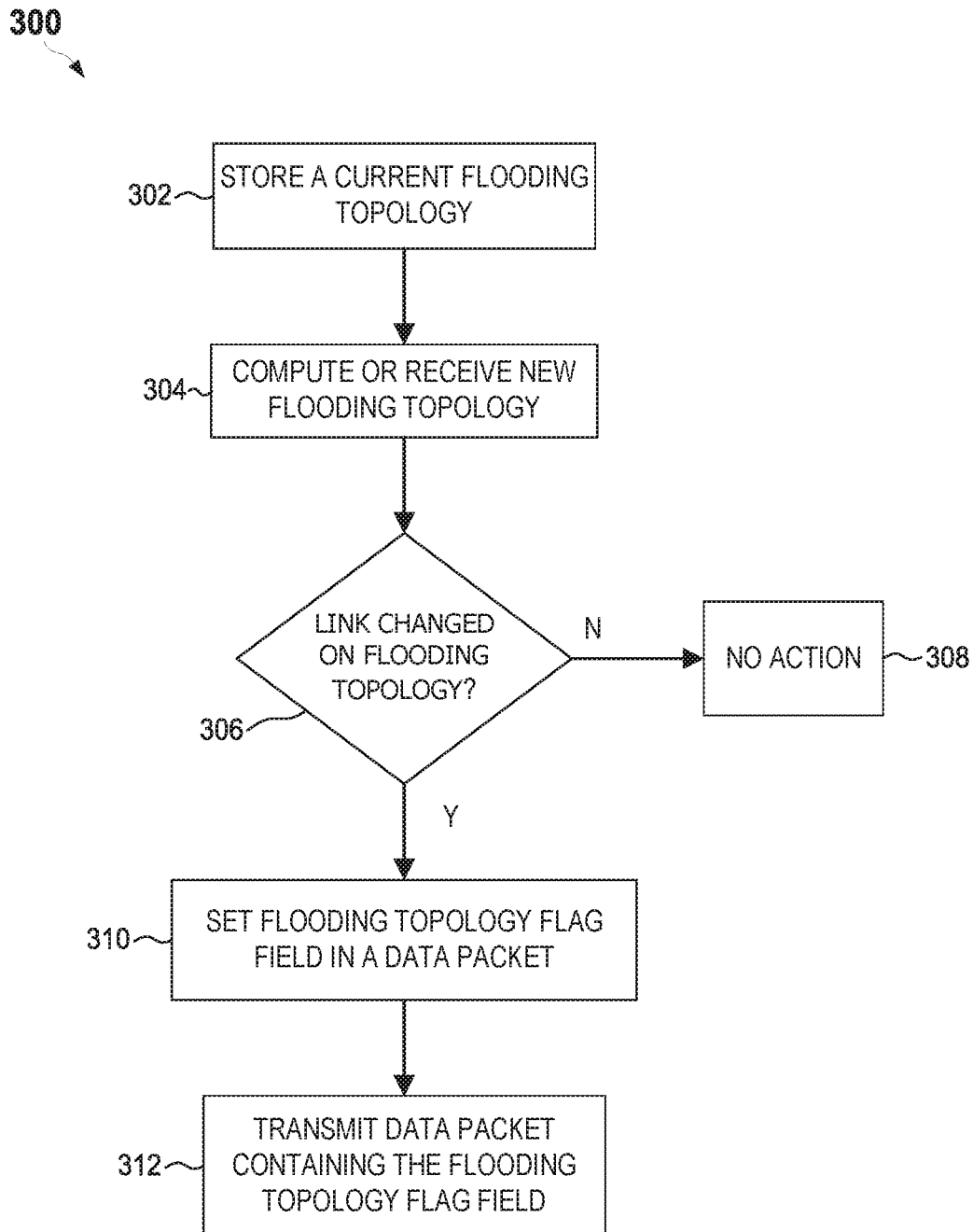
FIG. 3 is a flowchart illustrating a method performed by a network node for handling Interior Gateway Protocol (IGP) flooding topology inconsistency in accordance with an embodiment of the present disclosure.

FIG. 3 is a flowchart illustrating a method 300 for handling IGP flooding topology inconsistency in accordance with an embodiment of the present disclosure. The method 300 is performed by a network node (N1) such as the network node A in FIG. 2. The method 300 begins at step 302 by storing a current flooding topology. The current flooding topology may have been previously computed by the network node or may have been received from a leader node responsible for calculating the flooding topology. At step 304, the method 300 computes or receives (e.g., computed by the leader) a new flooding topology. The new flooding topology may be computed at periodic time intervals or may be computed in response to receiving a notification of a change to the current network/topology (e.g., an LS notification that a link has been added, removed, failed, etc.). The method 300 determines at step 306 whether a link between N1 and a second node (N2) is changed on the flooding topology. In an embodiment, if the link between N1 and a second node (N2) is not changed on the flooding topology, the method 300 performs no action at step 308, and terminates. If the method 300 determines that the link between N1 and a second node (N2) is on the new flooding topology but not on the current flooding topology, the method 300 at step 310 sets a flooding topology flag field (FT field) for the link to one (1) in a data packet to indicate that the link between N1 and N2 is on the new flooding topology; otherwise, if the link between N1 and N2 is not on the new flooding topology but on the current flooding topology, the method 300 sets the FT field for the link to zero (0). At step 312, the method 300 transmits the data packet containing the flooding topology flag field to at least one node in the network. For example, N1 may distribute the data packet containing the flooding topology flag field of the link to N2.

Figure 4:
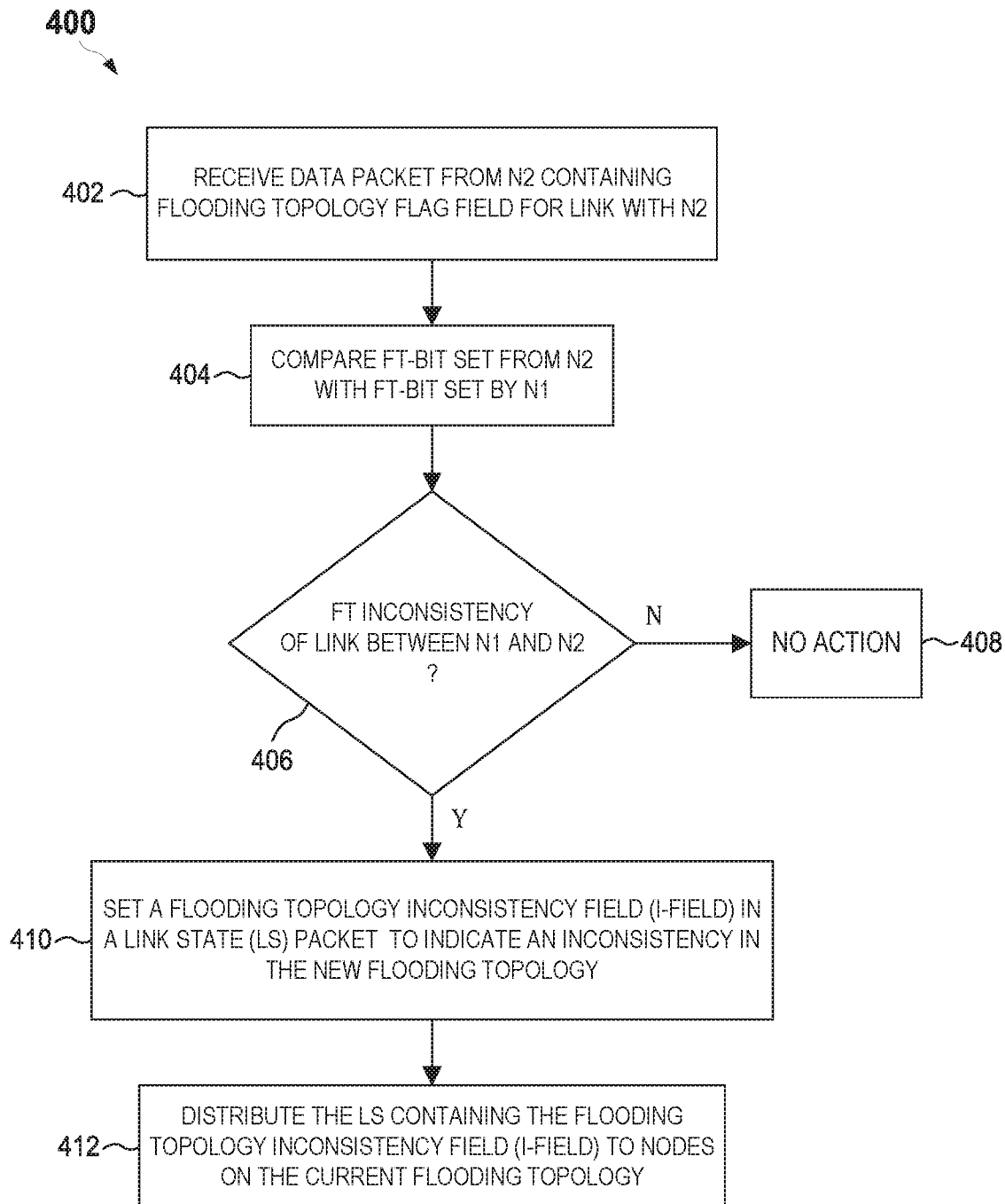
FIG. 4 is a flowchart illustrating a method performed by a network node for handling IGP flooding topology inconsistency in accordance with an embodiment of the present disclosure.

FIG. 4 is flowchart illustrating a method 400 performed by a network node for handling IGP flooding topology inconsistency. The method 400 is performed by a network node (N1) such as the network node A in FIG. 2. The method begins at step 402 by receiving a data packet from a second node 2 (N2) that contains a flooding topology field for a link between N1 and N2. The method 400 at step 404 compares the flooding topology flag field or FT-bit set by N2 in the data packet to the FT-bit as set or determined by N1, which may have been previously sent in a data packet to N2 as described by the method 300 in FIG. 3.

The method 400 at step 406 determines whether there is a flooding topology inconsistency of the link between N1 and N2 on the new flooding topology based on the flooding topology flag field set by N2 in the second data packet and the flooding topology flag field set by N1. For example, if both N1 and N2 set the flooding topology flag field or FT-bit to 1 because the link between N1 and N2 is on the new flooding topology, then the method 400 determines that there is no flooding topology inconsistency of the link between N1 and N2. Similarly, if both N1 and N2 set the flooding topology flag field or FT-bit to 0 because the link between N1 and N2 is not on the new flooding topology, the method 400 determines that there is no flooding topology inconsistency of the link between N1 and N2. In an embodiment, if there is no flooding topology inconsistency, the method 400 takes no action at step 408.

If the method 400 determines that there is a flooding topology inconsistency of the link between N1 and N2 (e.g., N1 sets the FT bit to 1, and N2 sets the FT bit to 0), then the method 400 at step 410 sets a flooding topology inconsistency field (I-field) (e.g., to 1) in a LS packet to indicate an inconsistency in the new flooding topology. In an embodiment, the method 400 may wait until the flooding topology inconsistency of the link between N1 and N2 is persistent for a given time (e.g., after having data packets that contain inconsistent FT-bit settings for 60 seconds) before setting the flooding topology inconsistency field (I-field) (e.g., to 1) in the LS packet to indicate an inconsistency in the new flooding topology. This can prevent false reporting of a flooding topology inconsistency in case one of the nodes has not updated its flooding topology. The LS packet is called a Link State Advertisement (LSA) in OSPF, and a Link State Protocol Data Unit (PDU) in IS-IS.

The method 400 at step 412 distributes the LS containing the flooding topology inconsistency field (I-field) to nodes in the network to make them aware of the flooding topology inconsistency of the link between N1 and N2. In some embodiments, a leader node may calculate and redistribute a new flooding topology in response to receiving the packet containing the flooding topology inconsistency field.

Figure 5:
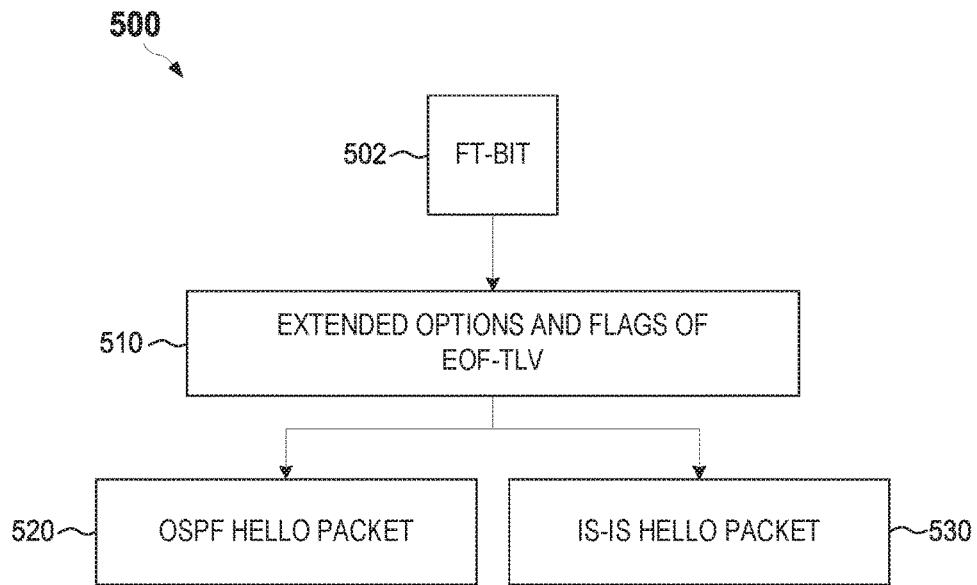
FIG. 5 is a schematic diagram illustrating an encoding scheme for a FT-bit in accordance with an embodiment of the present disclosure.

FIG. 5 is a schematic diagram illustrating an encoding scheme 500 for a FT-bit in accordance with an embodiment of the present disclosure. In an embodiment, the FT-bit 502 is one (1) bit. In alternative embodiments, the FT-bit 502 may be represented using more than one bit. In the depicted embodiment, a FT-bit 502 is inserted into an unused bit space of an extended options and flags (EOF) field of an EOF-TLV 510 (example illustrated in FIG. 10 for OSPF Hello, and FIG. 18 for IS-IS Hello). The EOF-TLV for OSPF is defined in RFC 5613. For OSPF, the EOF-TLV 510 can be inserted into an OSPF Hello packet 520, and sent to an adjacent node. For IS-IS, the EOF-TLV 510 can be inserted into an IS-IS Hello Packet 530, and sent to an adjacent node.

Figure 6:
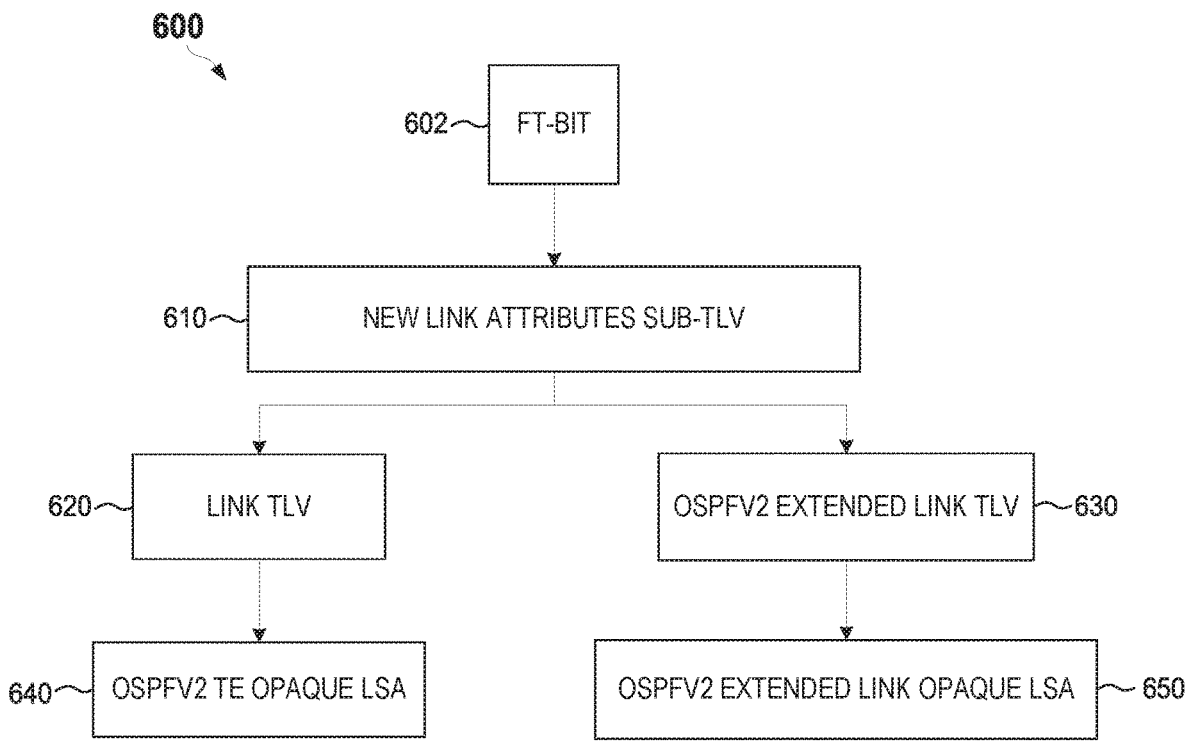
FIG. 6 is a schematic diagram illustrating an encoding scheme for a FT-bit in accordance with another embodiment of the present disclosure.

FIG. 6 is a schematic diagram illustrating an encoding scheme 600 for the FT-bit 602 in accordance with another embodiment of the present disclosure. The FT-bit 602 is similar to the FT-bit 502 of FIG. 5. In the depicted embodiment, the FT-bit 602 is inserted into an unused bit space of a newly defined Link Attributes Sub-TLV 610 (example illustrated in FIG. 12).

Figure 13:
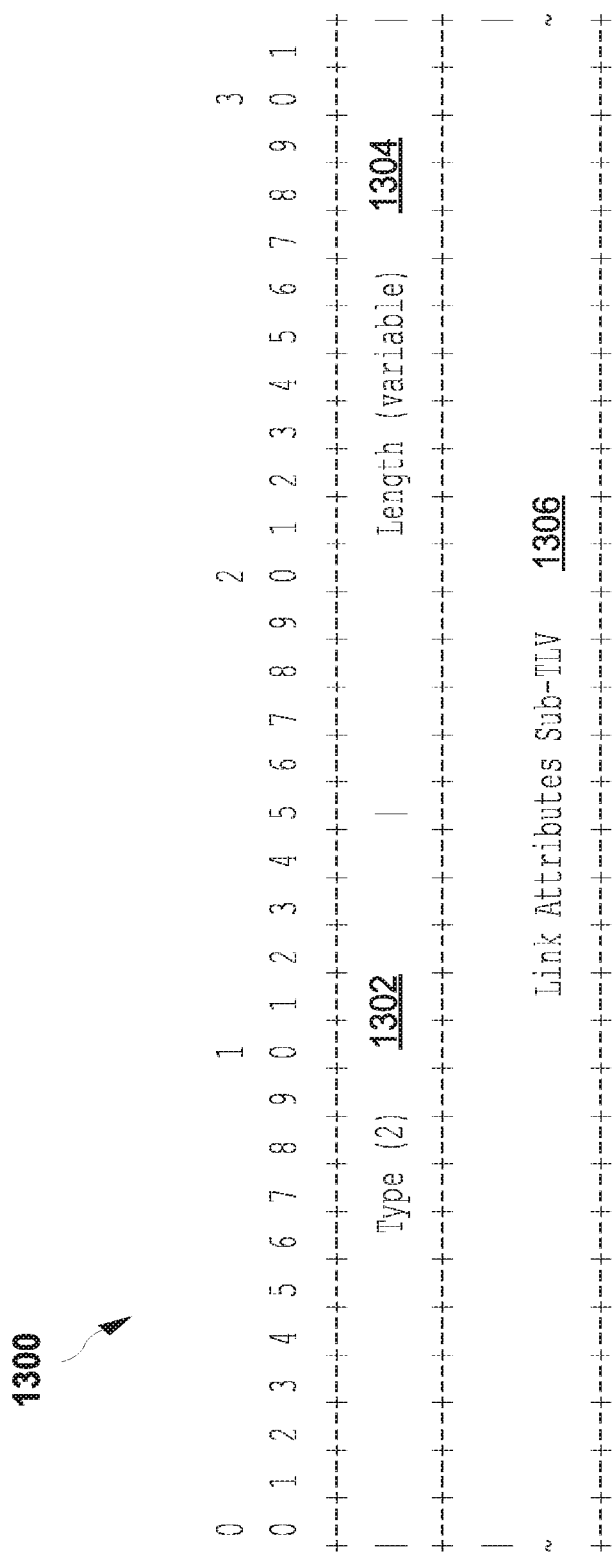
FIG. 13 is a schematic diagram illustrating a link TLV in accordance with another embodiment of the present disclosure.

In an embodiment, for OSPFv2, the new Link Attributes Sub-TLV 610 can be included in a Link TLV 620 defined in RFC 3630 (example illustrated in FIG. 13). The Link TLV 620 can be included in an OSPFv2 Traffic Engineering (TE) Opaque LSA 640 that is originated by the node to which the link is attached (example illustrated in FIG. 14). The OSPFv2 TE Opaque LSA 640 is sent to other nodes in the network.

Figure 15:
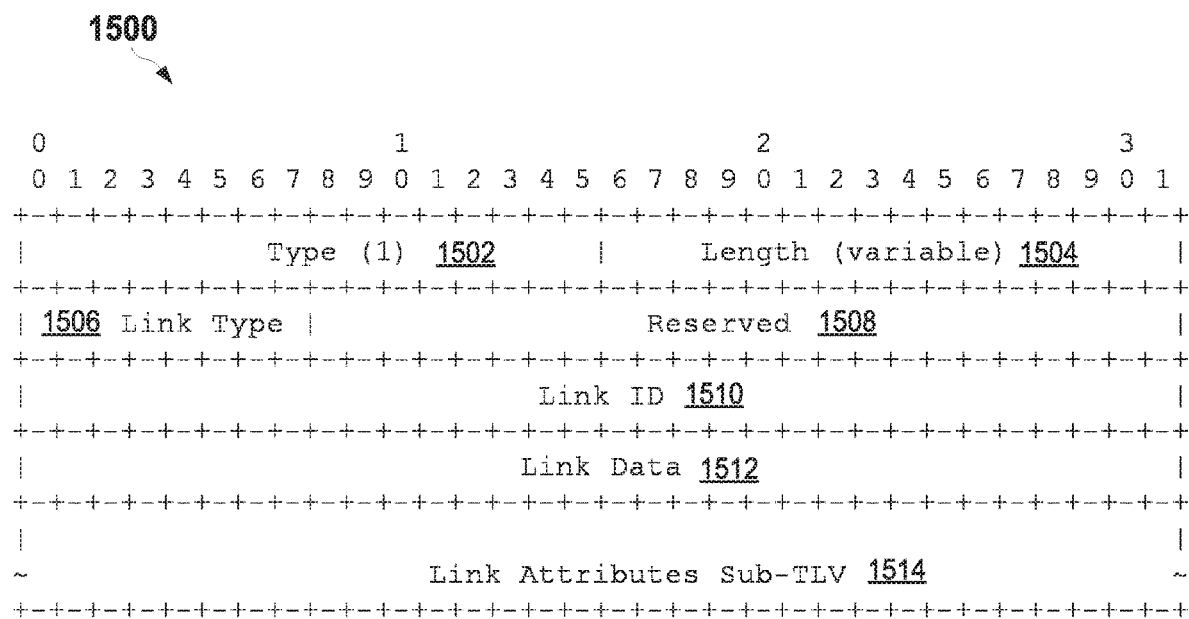
FIG. 15 is a schematic diagram illustrating an OSPFv2 extended link TLV in accordance with another embodiment of the present disclosure.

In another embodiment, for OSPFv2, the new Link Attributes Sub-TLV 610 can be included in an OSPFv2 Extended Link TLV 630 defined in RFC 7684 (example illustrated in FIG. 15). In one embodiment, if only one of the two TLVs (Link TLV 620 or OSPFv2 Extended Link TLV 630) is distributed in the network, the Link Attributes Sub-TLV 610 will be included in the TLV that is distributed in the network. For example, when only the Link TLV 620 is distributed in the network for a link (i.e., no extended link TLV is distributed for the link), the Link Attributes Sub-TLV 610 is included in the Link TLV 620 for the link, which is advertised in a TE Opaque LSA in the network. Alternatively, in another embodiment, if only one of the two TLVs (Link TLV 620 or OSPFv2 Extended Link TLV 630) is distributed in the network, the Link Attributes Sub-TLV 610 will be included in an OSPFv2 Extended Link TLV 630, which is then distributed using an Extended Link Opaque LSA in the network. In an embodiment, if both TLVs are distributed in the network (i.e., the Link TLV 620 for the link and the OSPFv2 Extended Link TLV 630 for the link are distributed in the network), the Link Attributes Sub-TLV 610 will be included in just the OSPFv2 Extended Link TLV 630, which is advertised in an Extended Link Opaque LSA in the network. Alternatively, in another embodiment, if both TLVs are distributed in the network (i.e., the Link TLV 620 for the link and the OSPFv2 Extended Link TLV 630 for the link are distributed in the network), the Link Attributes Sub-TLV 610 will be included in just the Link TLV 620. In a preferred embodiment, if neither of the two TLVs is distributed in the network, the Link Attributes Sub-TLV 610 will be included in the OSPFv2 Extended Link TLV 630, which is then distributed using an Extended Link Opaque LSA in the network.

An OSPFv2 Extended Link Opaque LSA 650 containing the OSPFv2 Extended Link TLV 630 (example illustrated in FIG. 16) is originated by the node to which the link is attached. The OSPFv2 Extended Link Opaque LSA 650 is sent to other nodes in the network.

Figure 7:
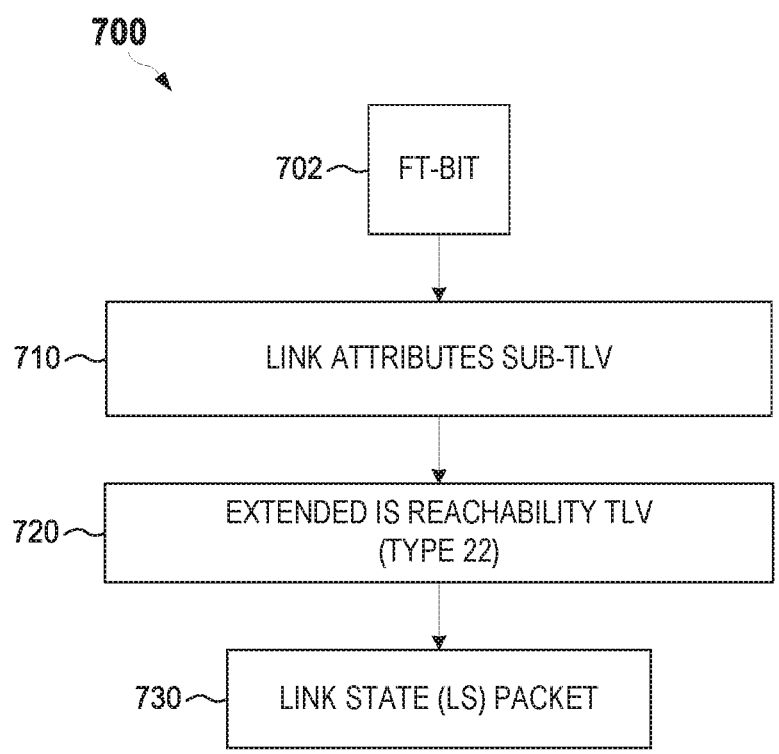
FIG. 7 is a schematic diagram illustrating an encoding scheme for a FT-bit in accordance with another embodiment of the present disclosure.

FIG. 7 is a schematic diagram illustrating an encoding scheme 700 for the FT-bit 702 in accordance with another embodiment of the present disclosure. The FT-bit 702 is similar to the FT-bit 502 of FIG. 5. In the depicted embodiment, for IS-IS, the FT-bit 702 is inserted into an unused bit space of a Link Attributes Sub-TLV 710. The Link Attributes Sub-TLV 710 is defined in RFC 5029 (example illustrated in FIG. 20). In an embodiment, the Link Attributes Sub-TLV 710 is carried within the extended IS reachability TLV 720. The extended IS reachability TLV is TLV type 22 defined in RFC 5305. In an embodiment, the extended IS reachability TLV is carried in an LS packet 730 transmitted to a node.

Figure 8:
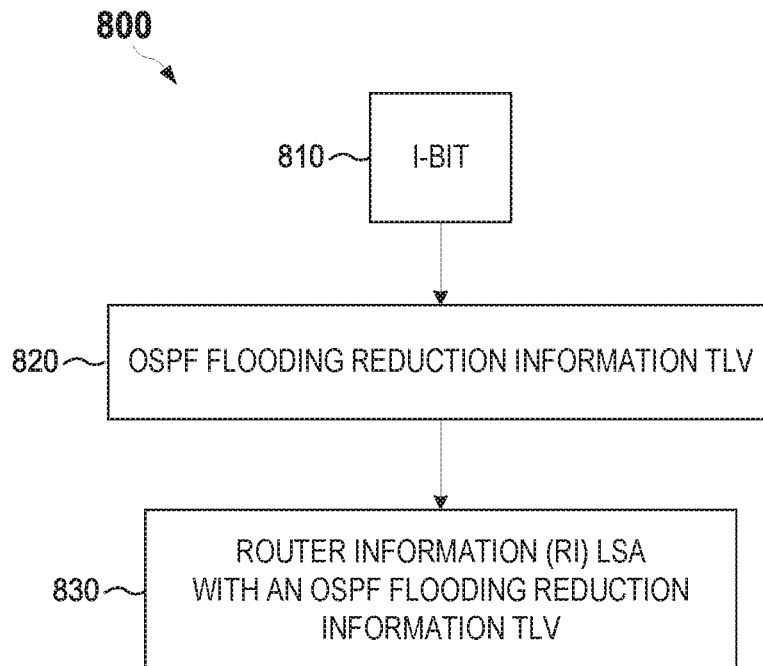
FIG. 8 is a schematic diagram illustrating an encoding scheme for a flooding topology inconsistency field or bit (I-bit) in accordance with an embodiment of the present disclosure.

FIG. 8 is a schematic diagram illustrating an encoding scheme 800 for a flooding topology inconsistency field or bit (I-bit) 810 in accordance with an embodiment of the present disclosure. In the depicted embodiment, the new I-bit 810 is defined in an OSPF Flooding Reduction Information TLV 820. For flooding reduction, every node originates a Router Information (RI) LSA 830 that includes the OSPF Flooding Reduction Information TLV 820 containing its priority to become a leader. In an embodiment, when a node sets the I-bit 810 to one in its RI LSA 830, it indicates that the flooding topology is inconsistent.

Figure 9:
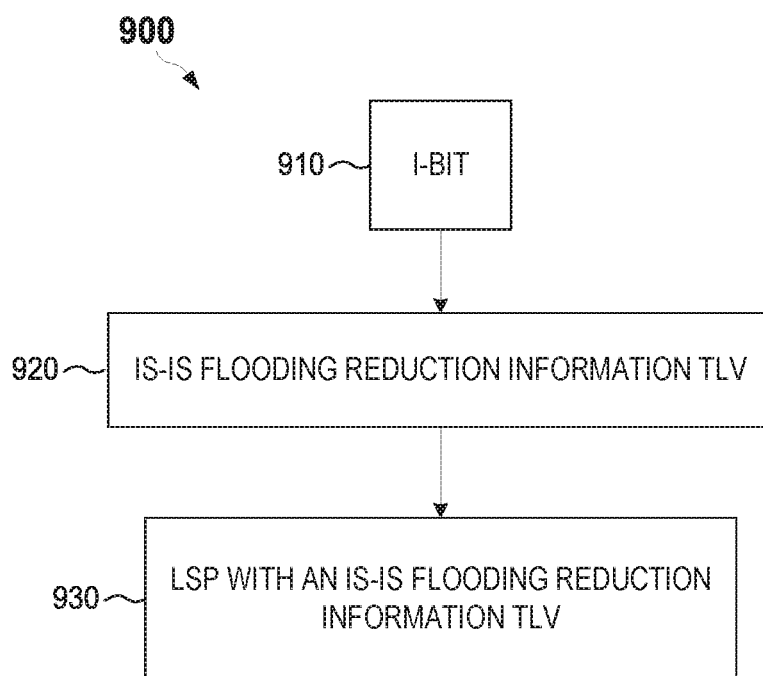
FIG. 9 is a schematic diagram illustrating an encoding scheme for an I-bit in accordance with another embodiment of the present disclosure.

FIG. 9 is a schematic diagram illustrating an encoding scheme 900 for an I-bit 910 in accordance with another embodiment of the present disclosure. In an embodiment, the I-bit 910 is one (1) bit. In alternative embodiments, the I-bit 910 may be represented using more than one bit. In the depicted embodiment, an I-bit 910 is inserted into an unused bit space of an IS-IS Flooding Reduction Information TLV 920 (example illustrated in FIG. 21). Similar to OSPF, for flooding reduction, every node originates an LSP with an IS-IS Flooding Reduction Information TLV 930 containing its priority to become a leader. In an embodiment, when a node sets the I-bit 910 to one in its LSP, it indicates that the flooding topology is inconsistent.

Figure 10:
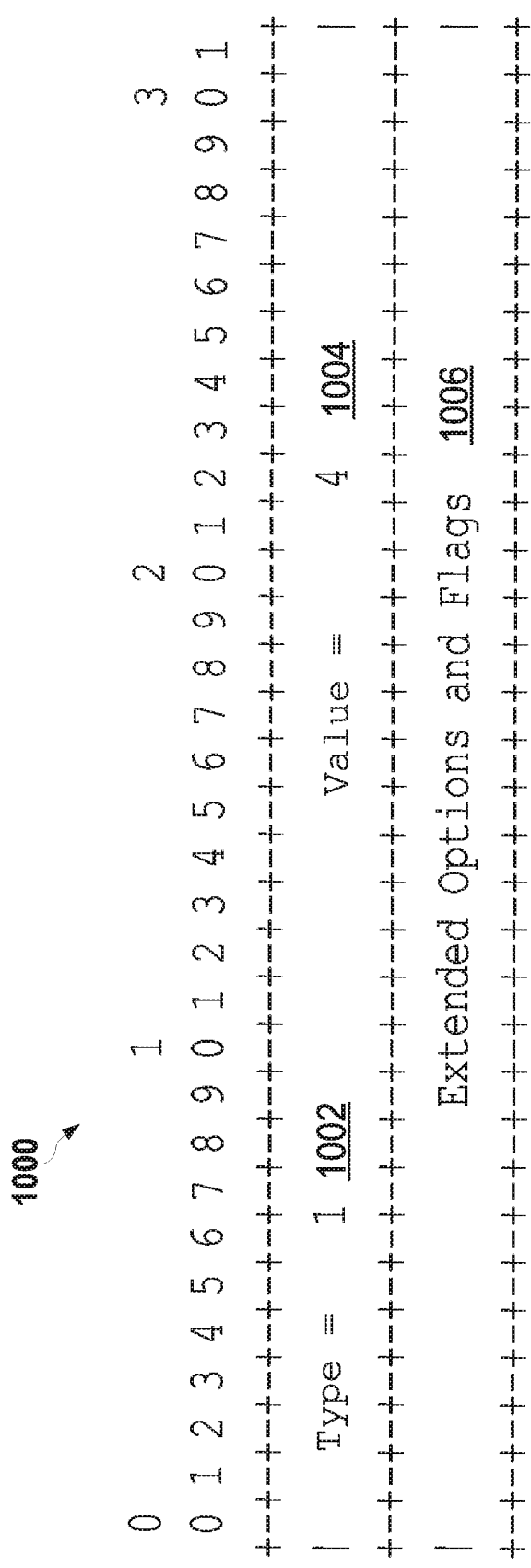
FIG. 10 is a schematic diagram illustrating an extended options and flag-type-length-value (EOF-TLV) in an Open Shortest Path First (OSPF) hello packet in accordance with another embodiment of the present disclosure.

FIG. 10 is a schematic diagram illustrating an EOF-TLV 1000 in accordance with another embodiment of the present disclosure. In an embodiment, the EOF-TLV 1000 is included in an OSPF hello packet. OSPF is a link-state intra-domain routing protocol. OSPF routers exchange information on a link using packets that follow a well-defined fixed format. In OSPF, a Hello packet is a special packet (message) that is sent out periodically from a router to establish and confirm network adjacency relationships. On networks capable of broadcast or multicast transmission, a Hello packet can be sent from a router simultaneously to other routers to discover neighboring routers. For example, an OSPF Hello packet may contain a link-local signaling (LLS) data block that includes the EOF-TLV 1000. The EOF-TLV 1000 can only appear once in the LLS data block. The EOF-TLV 1000 is defined in RFC 5613.

The value of the Type field 1002 in the EOF-TLV 1000 is 1 to indicate that it is an EOF-TLV. The length of the Value field 1004 in the EOF-TLV 1000 is 4 bytes. Bits in the Value field 1004 do not have any semantics from the point of view of the LLS mechanism. Bits may be allocated to announce OSPF link-local capabilities. Bits may also be allocated to perform Boolean link-local signaling.

The EOF-TLV 1000 includes an Extended Options and Flags (EOF) field 1006 that can be used to carry certain option and/or flag settings. For example, currently, OSPF Out-of-Band (OOB) Link State Database (LSDB) Resynchronization and OSPF Restart Signaling use bits in the Extended Options field of the EOF-TLV 1000.

Figure 11:
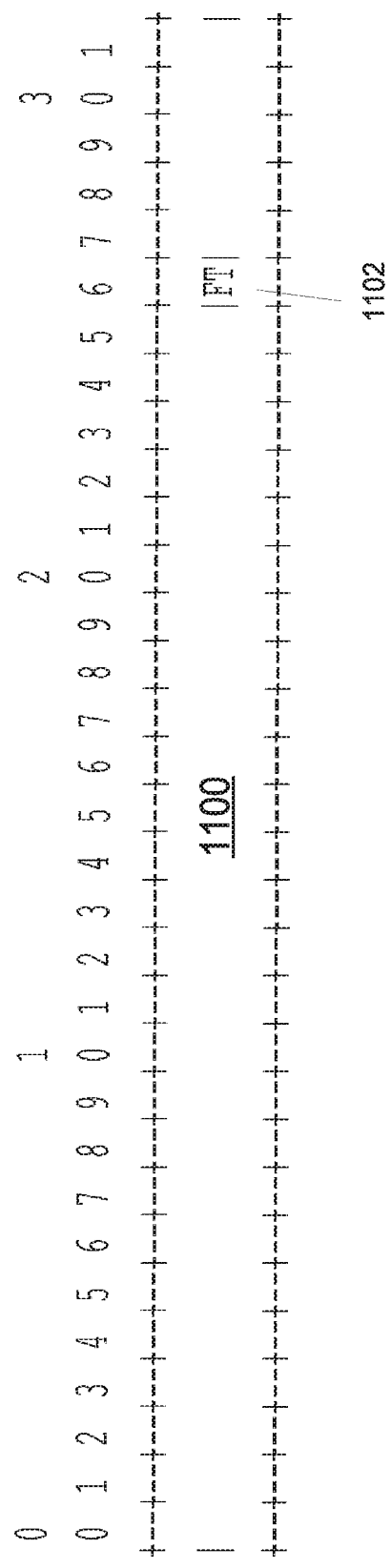
FIG. 11 is a schematic diagram illustrating an extended options and flags field in the EOF TLV in accordance with another embodiment of the present disclosure.

FIG. 11 is a schematic diagram illustrating an extended options and flags field 1100 in accordance with another embodiment of the present disclosure. The extended options and flags field 1100 can be included in an EOF-TLV such as EOF-TLV 1000 in FIG. 10. An FT flag field 1102 is included in the extended options and flags field 1100. As described above, the FT flag field 1102 is used to indicate whether a link between a first node and a second node is on a flooding topology. For example, if a link between a first node and a second node is on a new flooding topology computed by the first node, the first node can set the FT flag field 1102 to one (1) to reflect the link between the first node and the second node on the new flooding topology.

In the depicted embodiment, the FT flag field 1102 uses one bit at the twenty-six bit position in the extended options and flags field 1100. In other embodiments, the FT flag field 1102 may use any unused bit position in the extended options and flags field 1100. Still, in some embodiments, the FT flag field 1102 may use more than one bit in the extended options and flags field 1100.

Figure 12:
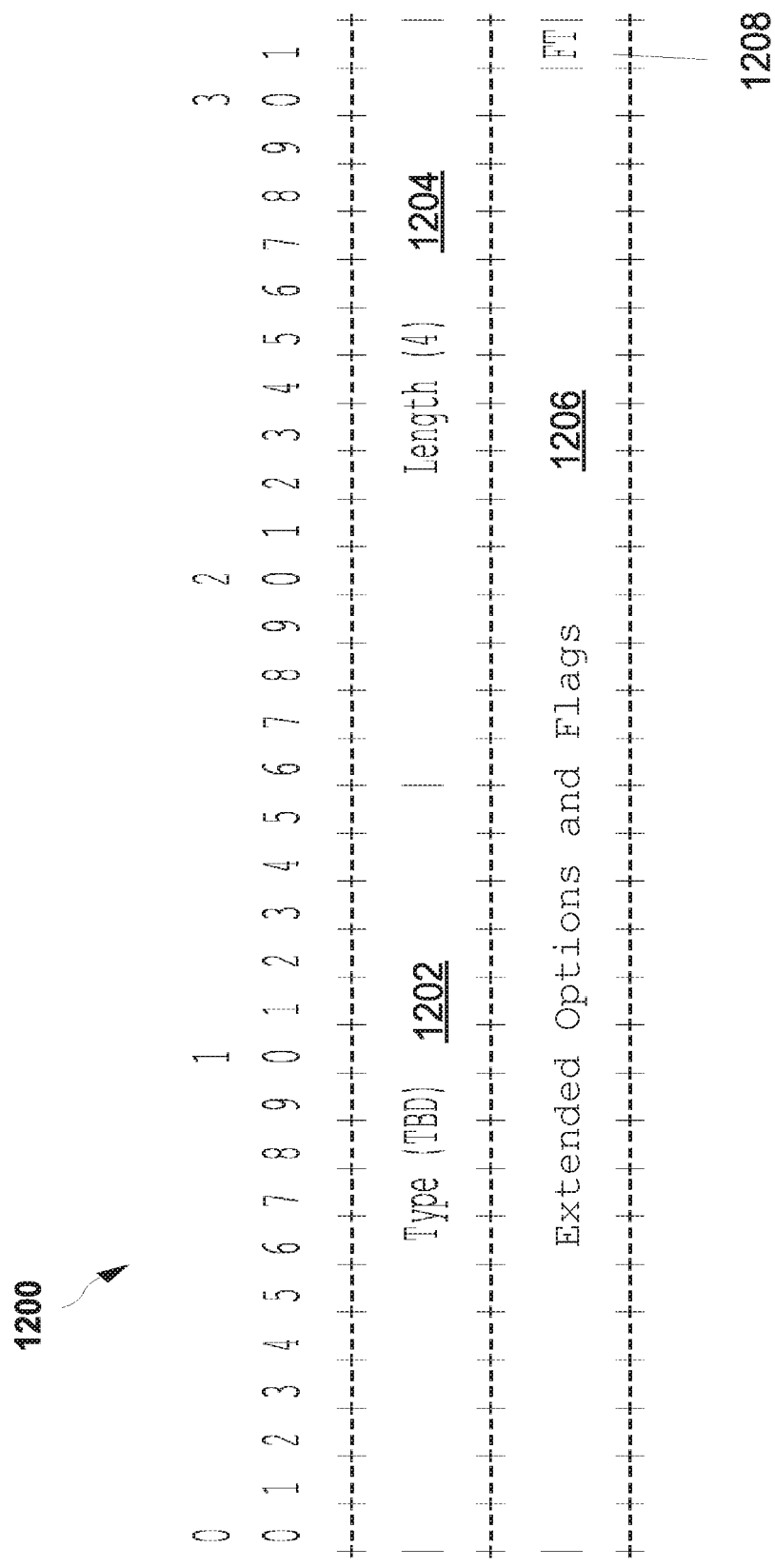
FIG. 12 is a schematic diagram illustrating a Link Attributes Sub-TLV in accordance with another embodiment of the present disclosure.

FIG. 12 is a schematic diagram illustrating a Link Attributes Sub-TLV 1200 in accordance with another embodiment of the present disclosure. The Link Attributes Sub-TLV 1200 is an example of the newly defined Link Attributes Sub-TLV 610 discussed in FIG. 6. Because the Link Attributes Sub-TLV 1200 is new, a type value for the type field 1202 of the Link Attributes Sub-TLV 1200 is to be determined (TBD). The type value indicates that the data structure is a Link Attributes Sub-TLV. In an embodiment, the length field 1204 of the Link Attributes Sub-TLV 1200 has a value of four (4). The Link Attributes Sub-TLV 1202 includes an Extended Options and Flags field 1206. A FT-bit 1208 (similar to the FT-bit 502 of FIG. 5) is inserted into an unused bit space of the Extended Options and Flags field 1206. In an embodiment, the FT-bit 1208 is set to one (1) to indicate that a link between a first node and a second node is on a new flooding topology, and set to zero (0) to indicate that the link between the first node and the second node is not on the new flooding topology.

FIG. 13 is a schematic diagram illustrating a Link TLV 1300 in accordance with another embodiment of the present disclosure. In an embodiment, the Link TLV 1300 is defined in RFC 3630. The Link TLV 1300 includes a type field 1302 containing a value of two (2) to indicate that it is a link TLV data structure. The Link TLV 1300 includes a length field 1304 to indicate the length of the Link TLV 1300. In an embodiment, the Link TLV 1300 can include a Link Attributes Sub-TLV 1306 (e.g., Link Attributes Sub-TLV 1200) containing a FT-bit (e.g., FT-bit 1206).

FIG. 14 is a schematic diagram illustrating an OSPFv2 Traffic Engineering (TE) Opaque Link State Advertisement (LSA) 1400 in accordance with another embodiment of the present disclosure. In an embodiment, for OSPFv2, the Link TLV 1300 carrying the new Link Attributes Sub-TLV 1200 containing the FT-bit 1208, is included in the OSPFv2 TE Opaque LSA 1400. The OSPFv2 TE Opaque LSA 1400 is originated by the node to which the link is attached. The OSPFv2 TE Opaque LSA 1400 is sent to other nodes in the network.

The OSPFv2 TE Opaque LSA 1400 includes a standard LSA header followed by a 32-bit aligned application-specific information field. The standard LSA header includes a LS age Field 1402, an Options field 1404, a LS Type field 1406, an Opaque Type field (1) 1408, an instance ID (identifier) field 1410, an Advertising Router field 1412, an LS Sequence Number field 1414, an LS Checksum field 1416, and a Length field 1418. The Link TLV field 1420 is the application-specific information field of the OSPFv2 TE Opaque LSA 1400. The LS age Field 1402 indicates the time in seconds since the LSA was originated. The Options field 1404 enables OSPF routers to support (or not support) optional capabilities, and to communicate their capability level to other OSPF routers. Examples of options that can be specified in the Options field 1404 are described in RFC 5250. The LS Type field 1406 identifies the LSA's range of topological distribution/link state advertisement. This range is referred to as the flooding scope. Opaque LSAs can have type 9, 10, or 11 link-state advertisements. A value of 9 denotes a link-local scope. Opaque LSAs with a link-local scope are not flooded beyond the local network or subnetwork. A value of 10 denotes an area-local scope. Opaque LSAs with an area-local scope are not flooded beyond their area of origin. A value of 11 denotes that the LSA is flooded throughout the Autonomous System (AS). Opaque LSAs with AS-wide scope are not flooded into stub areas or not-so-stubby areas (NSSAs). In an embodiment, the LS Type field 1406 of the OSPFv2 TE Opaque LSA 1400 is set to ten (10) to denote an area-local flooding scope. Type-10 Opaque LSAs are not flooded beyond the borders of their associated area. The Opaque Type field 1408 indicates the type data of the OSPFv2 TE Opaque LSA 1400. The instance ID field 1410 is used to maintain multiple Traffic Engineering LSAs. The Advertising Router field 1412 indicates the Router ID of the router that originated the LSA. For example, in network-LSAs this field is equal to the Router ID of the network's Designated Router. The LS Sequence Number field 1414 indicates the sequence number of the LSA. Successive instances of an LSA are given successive LS sequence numbers. The sequence number can be used to detect old or duplicate LSA instances. The LS Checksum field 1416 provides the checksum of the complete contents of the LSA, including the LSA header, but excluding the LS age Field 1402. The Length field 1418 indicates the length of the OSPFv2 TE Opaque LSA 1400 in bytes. The Link TLV field 1420 is used to carry a Link TLV such as the Link TLV 1300 of FIG. 13.

FIG. 15 is a schematic diagram illustrating an OSPFv2 Extended Link TLV 1500 in accordance with another embodiment of the present disclosure. In another embodiment, for OSPFv2, the new Link Attributes Sub-TLV 1200 can be carried in the OSPFv2 Extended Link TLV 1500. The OSPFv2 Extended Link TLV 1500 is used to advertise various attributes of the link. The OSPFv2 Extended Link TLV 1500 describes a single link and is constructed of a set of sub-TLVs.

The OSPFv2 Extended Link TLV 1500 includes a Type field 1502, a length field 1504, a Link Type field 1506, a Reserved field 1508, a Link ID field 1510, a Link Data field 1512, and a Link Attributes Sub-TLV field 1514. The Type field 1502 indicates the TLV type. The value is one (1) for this TLV type. The length field 1504 indicates the length of the OSPFv2 Extended Link TLV 1500. The length of the OSPFv2 Extended Link TLV 1500 is variable (i.e., not fixed) depending on the sub-TLVs carried by the OSPFv2 Extended Link TLV 1500. The Link Type field 1506 indicates the router link type. For example, type-1 indicates point-to-point connection to another router, type-2 indicates connection to a transit network, type-3 indicates connection to a stub network, and type-4 indicates a virtual link. The Reserved field 1508 is reserved for future use. The Link ID field 1510 identifies the object that this router link connects to. Value depends on the link's Type. When connecting to an object that also originates an LSA (i.e., another router or a transit network) the Link ID is equal to the neighboring LSA's Link State ID. The Link Data field 1512 is used to calculate the Internet Protocol (IP) address of the next hop. The value of the Link Data field 1512 depends on the link's Type field. For connections to stub networks, the Link Data field 1512 specifies the network's IP address mask. For unnumbered point-to-point connections, the Link Data field 1512 specifies the interface's MIB-II ifIndex value. For the other link types it specifies the router interface's IP address. The Link Attributes Sub-TLV field 1514 is used to carry the new Link Attributes Sub-TLV 1200 described in FIG. 12.

The OSPFv2 Extended Link TLV 1500 can be carried in an OSPFv2 Extended Link Opaque LSA. As an example, FIG. 16 is a schematic diagram illustrating an OSPFv2 Extended Link Opaque LSA 1600 in accordance with an embodiment of the present disclosure. The OSPFv2 Extended Link Opaque LSA 1600 is originated by the node to which the link is attached. The OSPFv2 Extended Link Opaque LSA 1600 includes a standard LSA header includes a LS age Field 1602, an Options field 1604, an LS Type field 1606, an Opaque Type field 1608, an instance ID field 1610, an Advertising Router field 1612, an LS Sequence Number field 1616, an LS Checksum field 1616, and a Length field 1618. The description for each of the standard LSA header fields are similar to the corresponding fields described in FIG. 14.

The OSPFv2 Extended Link Opaque LSA 1600 includes an Extended Link TLV field 1620 that is used to carry the OSPFv2 Extended Link TLVs such as OSPFv2 Extended Link TLV 1500 described in FIG. 15.

FIG. 17 is a schematic diagram illustrating an OSPF Flooding Reduction Information (RI) TLV 1700 in accordance with another embodiment of the present disclosure. The OSPF Flooding RI TLV 1700 includes the information on flooding reduction of a node. In an embodiment, the OSPF Flooding RI TLV 1700 can be included in Router Information (RI) LSA. For flooding reduction, every node originates a RI LSA with the OSPF Flooding RI TLV 1700 containing its priority to become a leader.

The OSPF Flooding RI TLV 1700 includes an INFO-TLV-Type field 1702, a TLV-Length field 1704, a Priority field 1706, a Reserved field 1708, and an optional sub TLVs field 1710. The INFO-TLV-Type field 1702 contains a value that identifies the OSPF Flooding RI TLV 1700 as a Flooding Reduction Instruction TLV (or Instruction TLV for short) that contains instructions about flooding reduction. The TLV-Length field 1704 specifies the length in bytes of the OSPF Flooding RI TLV 1700. The priority field 1706 consists of eight bits and is used to indicate the priority of the node originating the OSPF Flooding RI TLV 1700 to become the leader node in central mode. The Reserved field 1708 contains bits that are reserved for future use. The optional sub TLVs field 1710 is used to carry optional sub-TLV.

In accordance with an embodiment, the OSPF Flooding RI TLV 1700 uses an unused reserved bit or bits in the Reserved field 1708 for a new flooding topology inconsistency field, flag, or bit, referred to as an I-field or I-bit 1712. In an embodiment, when a node sets the I-bit 1712 to one (1) in its RI LSA, it indicates that the flooding topology is inconsistent.

Figure 18:
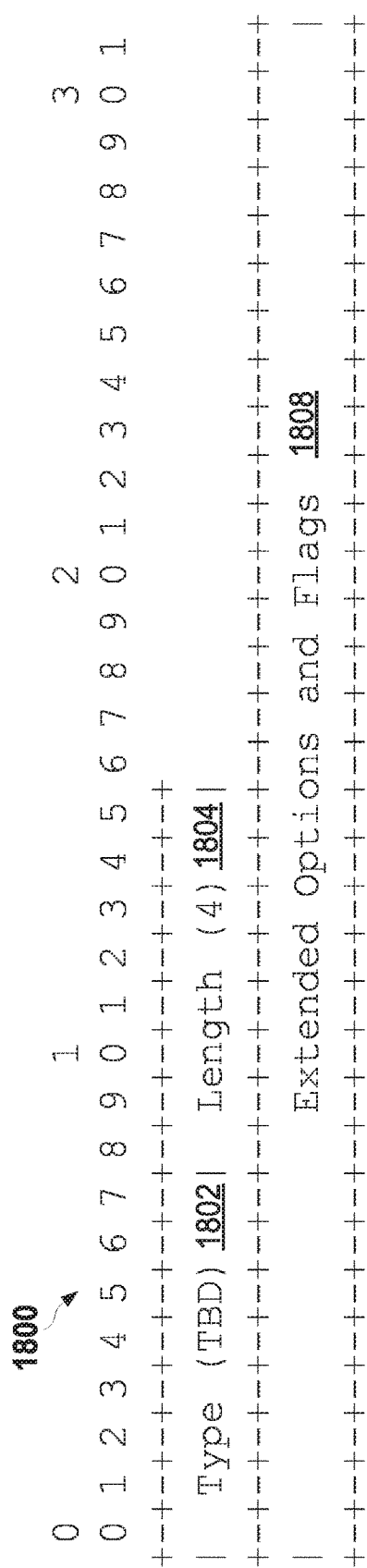
FIG. 18 is a schematic diagram illustrating an EOF-TLV in an intermediate system to intermediate system (IS-IS) hello packet in accordance with another embodiment of the present disclosure.

FIG. 18 is a schematic diagram illustrating an EOF-TLV 1800 in accordance with another embodiment of the present disclosure. In an embodiment, the EOF-TLV 1800 is included in an IS-IS hello packet. IS-IS is a routing protocol designed to move information efficiently within a computer network by determining the best route for data through a packet-switched network. IS-IS Hello packets are used to establish and maintain adjacencies between IS-IS neighbors. The EOF-TLV 1800 includes a Type field 1802, a Length field 1804, and an Extended Options and Flags (EOF) field 1808. The value of the Type field 1802 in the EOF-TLV 1800 is to be determined (TBD) because the EOF-TLV 1800 is a new TLV. The length of the Length field 1804 in the EOF-TLV 1800 is 4 bytes. The EOF field 1808 can be used to carry certain option and/or flag settings.

Figure 19:
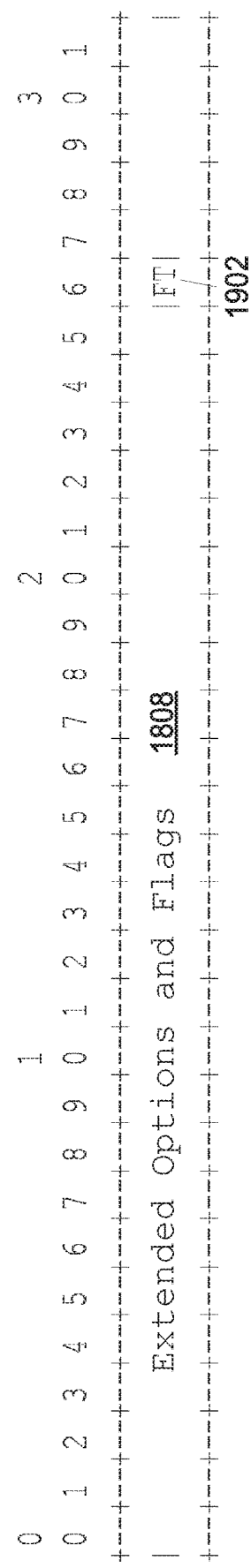
FIG. 19 is a schematic diagram illustrating an FT-bit in an extended options and flags field of the EOF-TLV IS-IS hello packet in accordance with another embodiment of the present disclosure.

As an example, referring to FIG. 19, a new FT bit 1902 is defined in the field of the EOF field 1808 of the EOF-TLV 1800. The FT bit 1902 can be assigned to any unused bit of the EOF field 1808. In an embodiment, when a node B receives a Hello packet from its adjacent node A over a link, if the FT bit 1902 is set to one (1) in the Hello packet, it will indicate that the link is on the flooding topology from node A's point of view (if set to zero (0) it means that the link is not on the flooding topology from node A's point of view). Similarly, when the node A receives a Hello packet from its adjacent node B over the link, if the FT bit 1902 is set to one (1) in the Hello packet, it will indicate that the link is on the flooding topology from node B's point of view (if set to zero (0) it means that the link is not on the flooding topology from node B's point of view).

Figure 20:
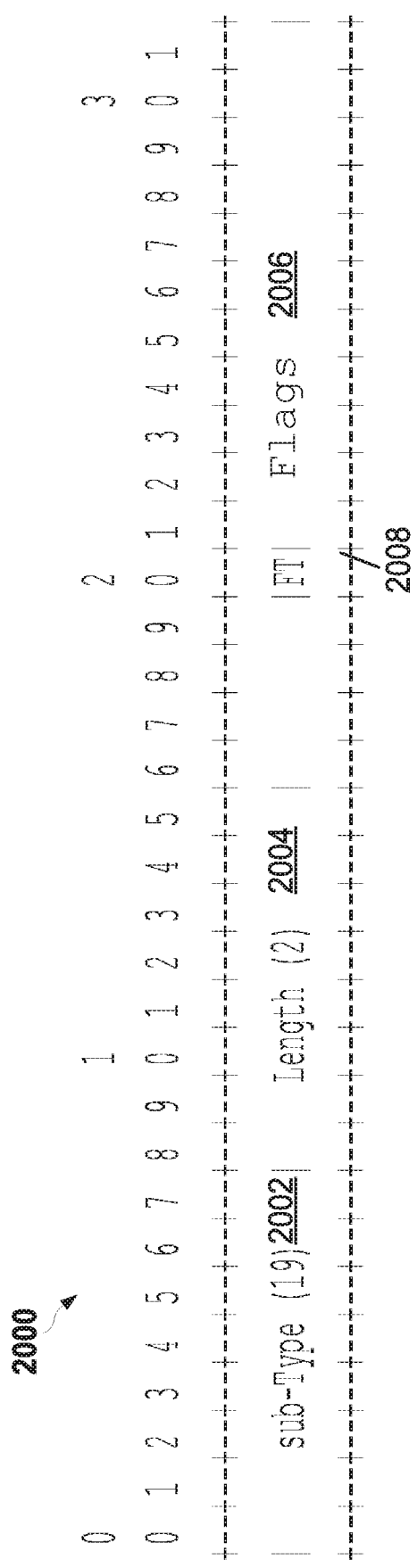
FIG. 20 is a schematic diagram illustrating an FT-bit in an IS-IS Link Attributes Sub-TLV in accordance with another embodiment of the present disclosure.

FIG. 20 is a schematic diagram illustrating an IS-IS Link Attributes Sub-TLV 2000 in accordance with another embodiment of the present disclosure. The standard IS-IS Link Attributes Sub-TLV is defined in RFC 5029. The IS-IS Link Attributes Sub-TLV 2000 includes a sub-type field 2002, a Length field 2004, and a flags field 2006. The sub-type field 2002 is eight bits, the Length field 2004 is eight bits, and the flags field 2006 consists of 16 bits. The Link-attribute sub-type is 19 and the link-attribute has a length of 2 octets. In an embodiment, a node can distribute FT link information to other nodes in the network using a newly defined FT bit 2008 in the IS-IS Link Attributes Sub-TLV 2000. The FT bit 2008 can be assigned any unused bit position in the flags field 2006.

In an embodiment, the IS-IS Link Attributes Sub-TLV 2000 can be carried within the extended IS reachability TLV (type 22) specified in RFC 3784. The extended IS reachability TLV is then included in a Link State Packet (LSP) that is sent to other nodes.

FIG. 21 is a schematic diagram illustrating an IS-IS Flooding Reduction Information TLV 2100 in accordance with another embodiment of the present disclosure. The IS-IS Flooding Reduction Information TLV 2100 includes the information on flooding reduction of a node. Similar to IS-IS, for flooding reduction, every node originates an LSP with an IS-IS Flooding Reduction Information TLV 2100 containing its priority to become a leader.

The IS-IS Flooding Reduction Information TLV 2100 includes an INF-Type field 2102, a Length field 2104, a Priority field 2106, a Reserved field 2108, and an optional sub TLVs field 2110. The INF-Type field 2102 contains a value (TBD) that identifies the IS-IS Flooding Reduction Information TLV 2100 as an IS-IS Flooding Reduction Instruction TLV (or Instruction TLV for short) that contains instructions about flooding reduction. The TLV-Length field 2104 specifies the length in bytes of the IS-IS Flooding Reduction Information TLV 2100. The priority field 2106 consists of eight bits and is used to indicate the priority of the node originating the IS-IS Flooding Reduction Information TLV 2100 to become the leader node in central mode. The Reserved field 2108 contains bits that are reserved for future use. The optional sub TLVs field 2110 is used to carry optional sub-TLV.

In accordance with an embodiment, the IS-IS Flooding Reduction Information TLV 2100 uses an unused reserved bit or bits in the Reserved field 2108 for a new flooding topology inconsistency field, flag, or bit (e.g., I-bit 2112). In an embodiment, when a node sets the I-bit 2112 set to one (1) in its LSP, it indicates that the flooding topology is inconsistent.

Figure 22:
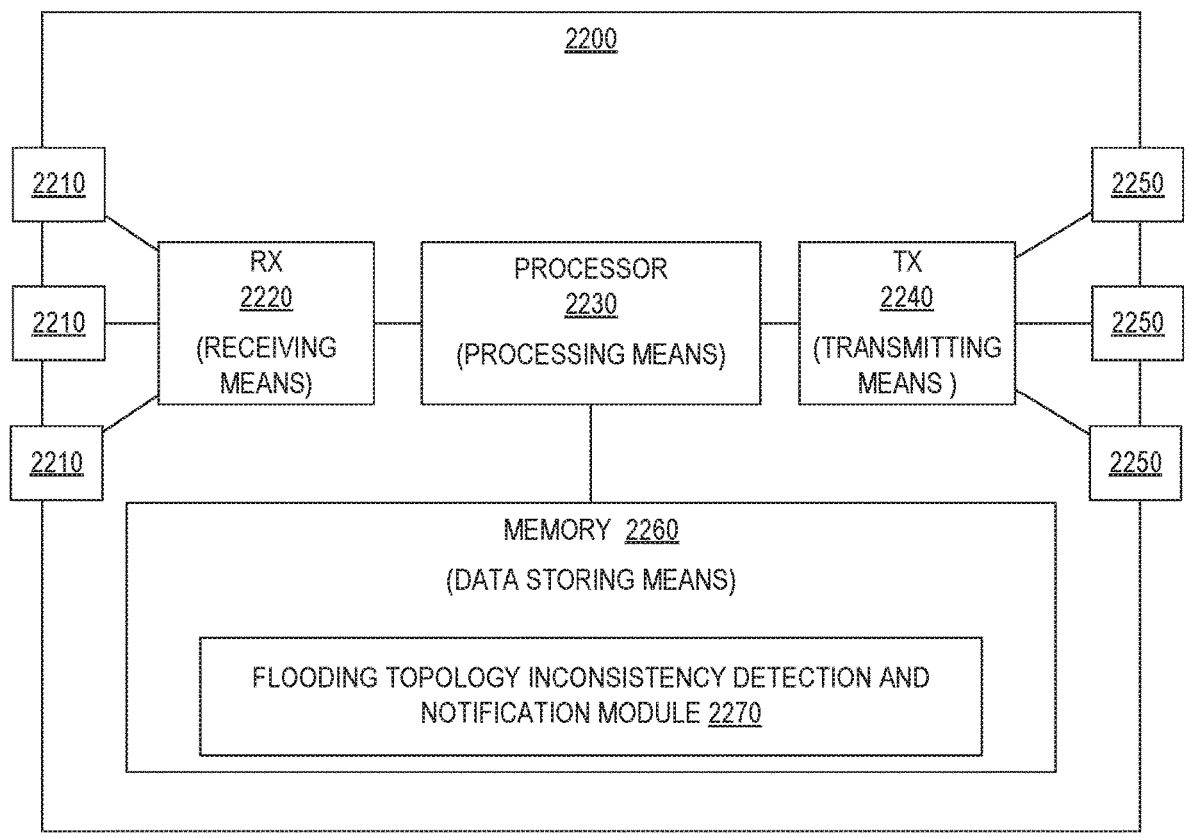
FIG. 22 is a schematic diagram illustrating a network node in accordance with another embodiment of the present disclosure.

FIG. 22 is a schematic diagram illustrating a network node 2200 in accordance with another embodiment of the present disclosure. The network node 2200 is suitable for implementing the disclosed embodiments as described herein. For example, node A and/or node B in FIG. 2 can be implemented using the network node 2200. The network node 2200 includes receiver units (RX) 2220 or receiving means for receiving data via ingress ports 2210. The network node 2200 also includes transmitter units (TX) 2240 or transmitting means for transmitting via data egress ports 2250.

The network node 2200 includes a memory 2260 or data storing means for storing the instructions and various data. The memory 2260 can be any type of memory or component capable of storing data and/or instructions. For example, the memory 2260 may be volatile and/or non-volatile memory such as read-only memory (ROM), random access memory (RAM), ternary content-addressable memory (TCAM), and/or static random-access memory (SRAM). The memory 2260 can also include one or more disks, tape drives, and solid-state drives and may be used as an over-flow data storage device, to store programs when such programs are selected for execution, and to store instructions and data that are read during program execution.

The network node 2200 has a processor 2230 or other processing means (e.g., central processing unit (CPU)) to process instructions. The processor 2230 may be implemented as one or more CPU chips, cores (e.g., as a multi-core processor), field-programmable gate arrays (FPGAs), application specific integrated circuits (ASICs), and digital signal processors (DSPs). The processor 2230 is communicatively coupled via a system bus with the ingress ports 2210, RX 2220, TX 2240, egress ports 2250, and memory 2260. The processor 2230 can be configured to execute instructions stored in the memory 2260. Thus, the processor 2230 provides a means for performing any computational, comparison, determination, initiation, or configuration (e.g., setting the F-bit or I-bit) steps, or any other action, corresponding to the claims when the appropriate instruction is executed by the processor 2230. In some embodiments, the memory 2260 can be memory that is integrated with the processor 2230.

In one embodiment, the memory 2260 stores a flooding topology inconsistency detection and notification module 2270. The flooding topology inconsistency detection and notification module 2270 includes data and executable instructions for implementing the disclosed embodiments. For instance, the flooding topology inconsistency detection and notification module 2270 can include instructions for implementing the methods as described in FIGS. 3 and 4. The inclusion of the flooding topology inconsistency detection and notification module 2270 substantially improves the functionality of the network node 2200 by enabling detection and notification of flooding topology inconsistencies.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a network node for Handling Interior Gateway Protocol (IGP) flooding topology inconsistency, the method comprising:

obtaining a new flooding topology, wherein the new flooding topology is obtained by one of computing or receiving the new flooding topology;

setting a flooding topology flag field (FT field) in a data packet to indicate whether a link between the network node and a second network node is on the new flooding topology;

transmitting the data packet containing the FT field to the second network node;

receiving a second data packet from the second network node, the second data packet comprising the FT field set by the second network node to indicate whether the link between the network node and the second network node is on the new flooding topology as determined by the second network node;

comparing the FT field set by the second network node in the second data packet to the flooding topology flag field set by the network node in the data packet;

setting a flooding topology inconsistency field (I-field) in a link state (LS) packet to indicate an inconsistency in the new flooding topology when the FT field set by the second network node in the second data packet and the FT field set by the network node are different for a given time; and distributing the LS packet containing the flooding topology I-field that is set to indicate the inconsistency in the new flooding topology to at least one node in the network.

2. The method of claim 1, wherein the LS packet containing the flooding topology I-field is a link state packet (LSP) with an Intermediate System to Intermediate System (IS-IS) Flooding Reduction Information type-length-value (TLV), and wherein the flooding topology I-field is included in the IS-IS Flooding Reduction Information TLV.

3. The method of claim 1, wherein the LS packet containing the flooding topology I-field is a Router Information (RI) Link State Advertisement (LSA) with an Open Shortest Path First (OSPF) Flooding Reduction Information type-length-value (TLV), and wherein the flooding topology I-field is included in OSPF Flooding Reduction Information TLV.

4. The method of claim 1, wherein the FT field is included in an Extended Options and Flag (EOF)-type-length-value (TLV), and wherein the data packet is an Open Shortest Path First (OSPF) Hello data packet that includes a link-local signaling (LLS) data block containing the EOF-TLV.

5. The method of claim 1, wherein the FT field is included in a Link Attributes Sub-TLV, the Link Attributes Sub-TLV is included in a Link TLV, and wherein the Link type-length-value (TLV) is included in an Open Shortest Path First (OSPFv2 )Traffic Engineering (TE) Opaque Link State Advertisement (LSA).

6. The method of claim 1, wherein the FT field is included in a Link Attributes Sub-TLV, the Link Attributes Sub-TLV is included in an Extended Link TLV, and wherein the type-length-value (TLV) is included in an Open Shortest Path First (OSPFv2) Extended Link Opaque Link Stae Adverstisement (LSA).

7. The method of claim 1, wherein the FT field is included in an Extended Options and Flag (EOF) type-length-value (TLV), defined in Intermediate System to Intermediate System (IS-IS), and wherein the data packet is an IS-IS Hello data packet that includes the EOF-TLV containing the FT field.

8. The method of claim 1, wherein the FT field is included in a Link Attributes Sub-TLV, and wherein the data packet is a link state packet (LSP) that includes an extended IS reachability type-length-value (TLV) that includes the Link Attributes Sub-TLV containing the FT field.

9. The method of claim 1, wherein the new flooding topology is received from a leader node of a topology that is designated to determine and distribute the new flooding topology.

10. The method of claim 1, wherein the given time is when the FT field set by the second network node is different than the FT field set by the network node in a predetermined number of data packets.

11. A network node comprising memory storing instructions; and a processor in communication with the memory, the processor configured to execute the instructions to cause the network node to:

obtain a new flooding topology, wherein the new flooding topology is obtained by one of computing or receiving the new flooding topology;

set a flooding topology flag field (FT field) in a data packet to indicate whether a link between the network node and a second network node is on the new flooding topology;

transmit the data packet containing the FT field to the second network node;

receive a second data packet from the second network node, the second data packet comprising the FT field set by the second network node to indicate whether the link between the network node and the second network node is on the new flooding topology as determined by the second network node;

compare the FT field set by the second network node in the second data packet to the FT field set by the network node in the data packet;

set a flooding topology inconsistency field (I-field) in a link state (LS) packet to indicate an inconsistency in the new flooding topology when the FT field set by the second network node in the second data packet and the FT field set by the network node are different for a given time; and distribute the LS packet containing the flooding topology I-field that is set to indicate the inconsistency in the new flooding topology to at least one node in the network.

12. The network node of claim 11, wherein the LS packet containing the flooding topology I-field is a link state packet (LSP) with an Intermediate System to Intermediate System (IS-IS) Flooding Reduction Information type-length-value (TLV), and wherein the flooding topology I-field is included in the IS-IS Flooding Reduction Information type-length-value (TLV).

13. The network node of claim 11, wherein the LS packet containing the flooding topology I-field is a Router Information (RI) Link State Advertisement (LSA) with an Open Shortest Path First (OSPF) Flooding Reduction Information type-length-value (TLV), and wherein the flooding topology I-field is included in OSPF Flooding Reduction Information TLV.

14. The network node of claim 11, wherein the FT field is included in an Extended Options and Flag (EOF) type-length-value (TLV), and wherein the data packet is an Open Shortest Path First (OSPF) Hello data packet that includes a link-local signaling (LLS) data block containing the EOF-TLV.

15. The network node of claim 11, wherein the FT field is included in a Link Attributes Sub-TLV, the Link Attributes Sub-TLV is included in a Link type-length-value (TLV), and wherein the Link TLV is included in an Open Shortest Path First (OSPFv2 ) Traffic Engineering (TE) Opaque Link State Advertisement (LSA).

16. The network node of claim 11, wherein the FT field is included in a Link Attributes Sub-TLV, the Link Attributes Sub-TLV is included in an Extended Link type-length-value (TLV), and wherein the Extended Link TLV is included in an Open Shortest Path First (OSPFv2 ) Extended Link Opaque Link State Advertisement (LSA).

17. The network node of claim 11, wherein the FT field is included in an Extended Options and Flag (EOF) type-length-value (TLV) defined in Intermediate System to Intermediate System (IS-IS), and wherein the data packet is an IS-IS Hello data packet that includes the EOF-TLV containing the FT field.

18. The network node of claim 11, wherein the FT field is included in a Link Attributes Sub-TLV, and wherein the data packet is a link state packet (LSP) that includes an extended IS reachability type-length-value (TLV) that includes the Link Attributes Sub-TLV containing the FT field.

19. The network node of claim 11, wherein the new flooding topology is received from a leader node of a topology that is designated to determine and distribute the new flooding topology.

20. The network node of claim 11, wherein the given time is when the FT field set by the second network node is different than the flooding topology flag field set by the network node in a predetermined number of data packets.

* * * * *